3,261,903
METHOD AND APPARATUS FOR FILM STRETCHING
Vernon R. Carr, Akron, Ohio, assignor to The Goodyear Tire & Rubber Company, Akron, Ohio, a corporation of Ohio
Filed July 2, 1963, Ser. No. 292,283
6 Claims. (Cl. 264—289)

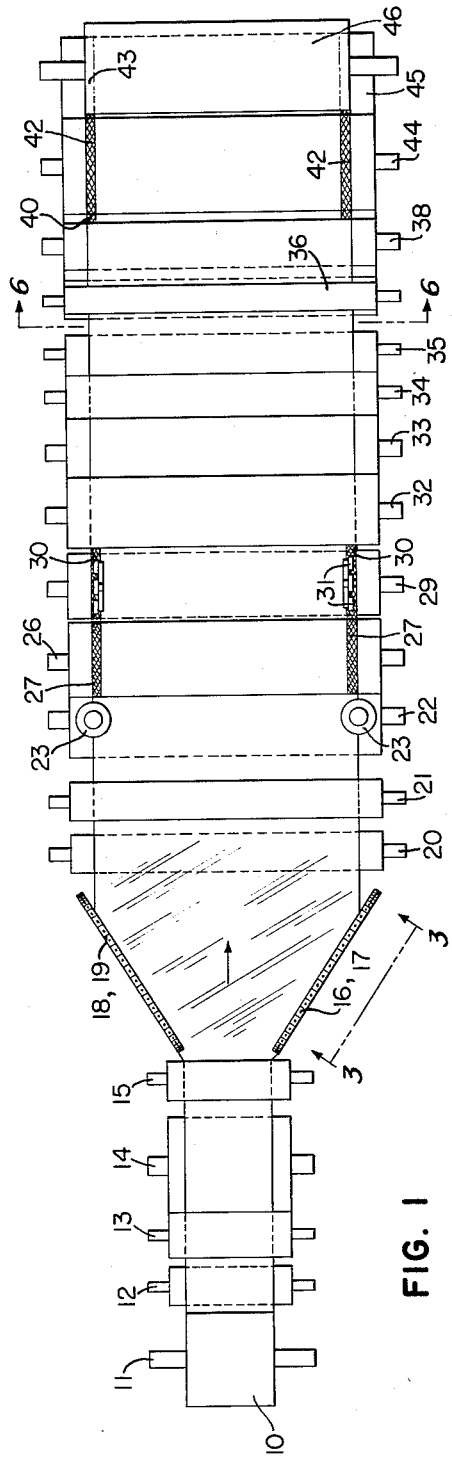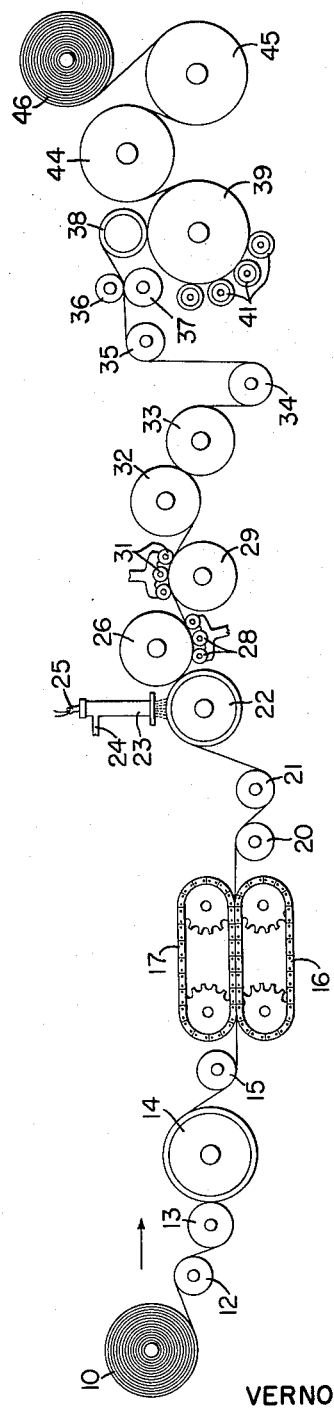

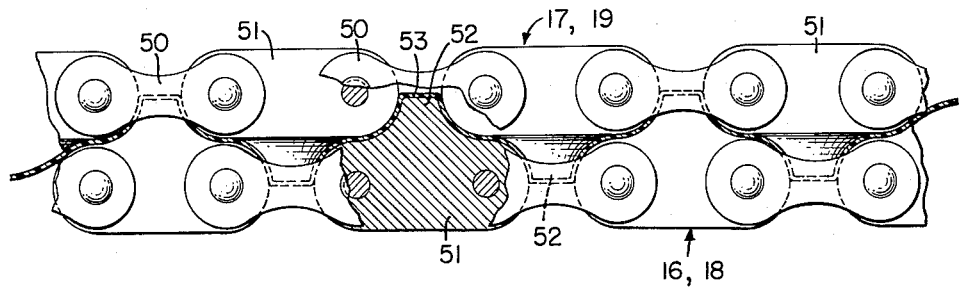
FIG. 3
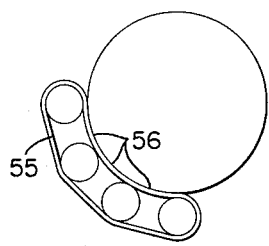
FIG. 7
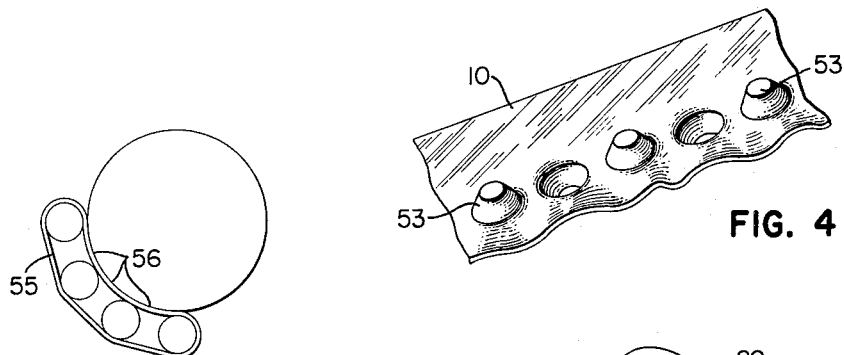
FIG. 4
FIG. 5
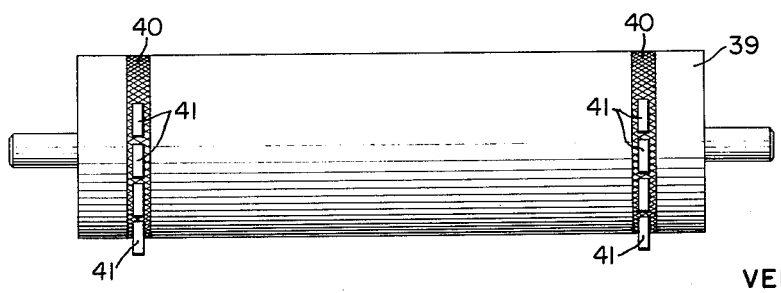
FIG. 6
INVENTOR.
VERNON R. CARR
BY
J.B. Holden
ATTORNEY United States Patent Office 3,261,903
Patented July 19, 1966

This invention relates to an improvement in the process of stretching plastic film. More particularly, the invention relates to an improved apparatus and method for stretching a thermoplastic film.

There are many films of crystallizable synthetic organic polymers. Examples of such films are films made of linear polymers such as polyethylene, isotactic polypropylene, linear polyamides, linear polyesters and the high molecular weight linear aromatic polyesters. Films formed from the above basic materials are useful in numerous applications such as packaging, metallized threads, adhesive tapes, magnetic tapes and protective coatings. The overall utility and versatility of such films are enhanced by improving the physical properties through uniaxial and biaxial stretching. The elongation or stretching is useful in orienting the molecular structure of the film. Typical films that lend themselves to stretching as described above are polyethylene terephthalate and terephthalate copolyesters including combinations produced by reacting ethylene glycol with ester-forming derivatives of terephthalic and isophthalic acids. Combinations such as those set forth above provide films with very high tensile strengths coupled with the ability to remain stable at relatively high temperatures. Orientation in copolyesters such as a 90/10 combination of terephthalic and isophthalic constituents is achieved by extruding the resin material through a die to form a film and immediately thereafter supercooling it to obtain the film in the amorphous state. The amorphous film is then stretched after the film has been heated to a temperature above its second order transition temperature. The term "second order transition temperature" can be defined as the temperature at which a discontinuity occurs in the curve of a first derivative thermodynamic quantity with temperature. The term also has correlation with the yield temperature and also the fluidity of the polymer. The term can be observed from a graphical representation of physical properties such as index of refraction, density, specific heat, specific volume plotted against temperature. The use of the term and its derivation is believed too common to merit further discussion herein.

A number of processes and different type of apparatus have heretofore been developed to stretch such films as presented above. The methods and the apparatus used to carry out the processes, generally involve stretching the film in one or both directions—i.e., longitudinally or transversely, simultaneously, or in sequence. The prior art processes can produce film that is considered to be uniformly stretched in biaxial directions. There are, however, certain difficulties encountered in the production of oriented films, especially when such processes are operated continuously.

As has been stated before, the film can be oriented in one direction, then in a direction generally normal thereto. Longitudinal elongation is easily accomplished by passing the film over a plurality of parallel aligned rollers that are traveling at successively faster peripheral speeds with respect to each other. As the film passes from one roll to the next faster moving roll, molecular orientation is imparted to the film in a uniaxial direction. The uniaxial molecular orientation produces increased tensile strength in the direction in which the film molecules are oriented.

Transverse stretching usually is accomplished by passing the stretched or unstretched film, as the case may be, through a stretching or tenter frame. As the film advances through the tenter frame, it is clamped or in some manner held along the edges by a series of closely spaced holding devices which in turn are attached to a moving chain. The chain travels longitudinally with respect to the film length and travels angularly outward from a direction parallel to the longitudinal axis of the film. As the chain and associated holding devices travel outwardly, the film is molecularly oriented in the transverse direction. A uniform transverse force can be realized only if there is no slippage of the film through the grasping portions of the chain holding devices. Because of the firm grasp on the edges of the film, it is sometimes deformed and thus can be detrimental in further stages of the film processing. The deformation of the film edges will be discussed more fully elsewhere.

When the film is oriented in one direction, there is always the tendency for the film to shrink or neck-down in a direction normal to the first stretch direction, therefore, various methods and means have been devised to minimize the neck-down encountered during the stretching of films. The present invention presents a satisfactory solution to the problems that have heretofore been set forth.

It is a primary object of this invention to provide an improved system of holding the edges of a film during the stretching and heat setting thereof.

Another object of the present invention is to provide film holding rolls.

A further object of the invention is to provide a method of straightening the deformities occurring at the film edge during a portion of the stretching operation.

An additional object of the present invention is to employ a series of small hold-down rolls in place of a rubber coated pressure roll that traverses the entire film width.

Additional objects will become apparent from the following discussion. A clear understanding of the apparatus employed and the steps constituting the improved method of the invention is illustrated in conjunction with the drawings which shows a schematic layout of the film stretching apparatus.

FIG. 1 is a schematic plan view showing a typical film processing apparatus.

FIG. 2 shows an elevational view of the apparatus shown in FIG. 1.

FIG. 3 is an enlarged view of the film gripping mechanism taken along line 3—3 of FIG. 1.

FIG. 4 is a perspective view of the film edge after it has been transversely stretched.

FIG. 5 is a perspective view showing the small hold-down rollers.

FIG. 6 is a side view of the first knurled heat-set rolls taken along line 6—6 of FIG. 1.

FIG. 7 is a view showing continuous belt in place of the small rubber coated rolls.

Referring to FIGS. 1 and 2 in the drawings, the film to be stretched is represented by numeral 10 and is supplied from roll 11. Film 10 is passed over roll 12 which aligns the film longitudinally before it is trained over nip roll 13. Roll 13 regulates the tension in film 10 and also presses the film into contact with heated rubber coated roll 14 which softens film 10. Roll 14 is of large enough diameter to insure a uniform heat transfer through the entire thickness of film 10. Heated film 10 is passed from roll 14 under roll 15 which guides it into the transverse gripping and stretching chains 16 and 17. Chains 16, 17 and counterpart chains 18, 19 grasp the film by a means which will be explained in more detail hereinafter. The chain drive mechanism moves in the direction in which the film is advancing through the apparatus. It also moves angularly outwardly and in so moving stretches the film transversely.

Roll 20 receives film 10 as it exits from the transverse stretch mechanism. The speed of roll 20 may be slightly greater than the forward speed of the film as it is being stretched transversely. An increased speed prevents the film from wrinkling or folding after it has passed the end of the stretch mechanism. Roll 21 serves as a guide roll which directs film 10 to rubber coated roll 22. As film 10 passes over roll 22, the edges of the film are externally heated by heat apparatus 23 located along each edge. Heat apparatus 23 comprises an air inlet 24 for attachment to any air source, a heating element, and electrical wires 25 which supply electrical energy to the heating element. As the air from air inlet 24 is passed through heat apparatus 23 it is heated by the heating element contained in 23. The heated air is directed on a narrow strip of film along each edge of film 10. The heated film relaxes and the indentations and irregularities caused by transverse stretch apparatus 16, 17 and 18, 19 smooth out. The edge condition of film 10 will be commented upon in more detail elsewhere.

Film 10 is directed by rubber coated roll 22 to heated roll 26 and a portion of the longitudinal stretch is imparted to the film as it advances through the first stretch zone formed by the space between rolls 26 and 29. The stretch in the film results since roll 29 is moving at a greater surface speed than roll 26. In a similar manner, stretch results between rolls 29 and 32 since roll 32 has a greater surface speed than does roll 29.

Roll 26 is knurled in areas or rings 27 near both ends. As hot film 10 passes over roll 22 the edges that are additionally heated by heat apparatus 23 are forced into knurled rings 27 by small rollers 28. Roll 29 is also knurled at areas 30 similar to areas 27 of roll 26. Small rollers 31 press the film against roll 29 and force film 10 into knurled surfaces 30. The knurled surfaces on rolls 26 and 29 hold film 10 and prevent it from shrinking in the transverse direction while it is being longitudinally stretched. Film 10 is fed from heated roll 29 to cold roll 32 after it is in the stretch zone between rolls 29 and 32. In each of the aforementioned stretch zones, the distance of unsupported film is kept to a minimum so that the film will not neck down transversely while undergoing longitudinal elongation. Roll 33 abuts cooling roll 32 and prevents the longitudinally stretched film 10 from slipping backward. Rubber coated roll 33 stabilizes film 10 before it advances through the final stages of its treatment. Roll 34 directs the film which has imparted therein both transverse and longitudinal elongation to roll 35. The film passes over roll 35 and enters the nip rolls 36 and 37 of the heat setting portion of the film processing apparatus. Silicone rubber coated roll 38 receives film 10 from nip rolls 36, 37 and holds it in intimate contact with heated roll 39. Heated roll 39 is also knurled at 40 on its cylindrical surface near the ends. Small rolls 41 force film 10 against the knurled surfaces 40 and thus hold the film tightly preventing transverse shrinkage during the heat setting operation. The imprint from the knurled surface 40 is then engaged on knurled surfaces 42 and 43 of heat setting rolls 44 and 45. The completely biaxially stretched and heat set film is then wound on roll 46.

FIGURE 3 is an enlarged view taken along the lines 3—3 of FIGURE 1 and shows the chain gripping mechanism. Chains 17 and 19 are composed of two different links 50 and 51. Link 51 is solid and contains protrusion 52 positioned such that it extends into the space between split link 50. Every other link of chains 16, 17 and 18, 19 contains protrusions 52. As film 10 is fed into the transverse stretch mechanism, protrusions 52 indent the film and provide a mechanical grip for holding the film.

FIGURE 4 shows a perspective view of the edge of film 10 as it exits from the transverse stretching mechanism. The irregular areas 53 are produced by the clamping action of protrusions 52. In this condition it is evident that film 10 is not an ideal membrane for conveying over a system of rollers. The function of rubber coated preheat roll 22 is to align the already heated transversely stretched film prior to entry into the longitudinal rolls 26, 29 and 32. It can be readily understood that irregular areas such as 53 tend to hold the film away from nip roll 22. In order to fully relax the deformed edges of film 10 before it undergoes longitudinal stretch or elongation, heat apparatus 23 directs a stream of hot air against the film surface. This additional heat helps to fully soften irregular areas 53 so that they can be smoothed out and elongated in a manner similar to the remaining cross-section of film 10. Also the extra heat supplied by heat apparatus 23 insures that rollers 28 will successfully force the edges of film 10 into knurled surfaces 27 and 30 of longitudinal stretch rolls 26 and 29.

FIGURE 5 is a perspective view showing the small hold-down rollers 28, 31 that are employed on rolls 26 and 29 to press film 10 into knurled surfaces 27 and 30. The small rollers can be spring loaded or any similar method (not shown) may be employed to act against roller carrier 54, thus providing ample pressure in order to coin film 10 into knurls 30. One of the advantages of employing a series of narrow rollers instead of rolls that span the entire film width is that pressure can be exerted over a very narrow film area. The remainder of the film is not subjected to the pressure of hold-down rolls which have a tendency to striate the film. Then, too, the pressure is exerted on an area of the film that eventually will be trimmed from the finished product. An additional advantage in employing small rollers in place of a large roll traversing the entire film width is that replacement time and costs are drastically reduced.

FIGURE 6 is a side view of roll 39 taken along line 6—6 of FIGURE 1. Also shown are small rolls 41 located on both ends of roll 39. Rolls 41 are coated with silicone rubber and are situated so that they bear against knurled surfaces 40 of roll 39. The chief advantage of rolls 41 are that they perform the same function as a large roll which would traverse the entire span. Since pressure rolls such as rolls for the purpose of bearing are generally rubber coated, they are quite expensive to recoat and irregular surface of the roll may transfer its marks to the film. With small individual rolls the amount of rubber required is reduced many times. This system works equally well for a narrow film width employing narrow rolls or a wide film that would necessitate large and long rolls.

Another method of holding the edges of the film against the knurled surfaces of the processing rolls is to employ endless belts in place of the small silicone rubber coated rolls. FIGURE 7 shows a typical arrangement whereby the rolls are interconnected with an endless belt 55 that provides continuous contact at 56, thus insuring a uniform gripping action of the knurled surfaces on the film that is being processed.

Thus, it can be seen that the present invention permits the utilization of a positive edge grip mechanism during the transverse stretching or elongation of the film. The deformities produced at the edge of the film during transverse stretching need not be trimmed off before subsequent film processing is carried out. The area in which the transverse stretching deformities occur is further utilized in that it is forced into engagement with the knurled roll surfaces of the longitudinal stretch mechanism. The edges of the film are pressed into the knurled surfaces of the stretch rolls by a series of small rollers that avoid the necessity of employing a full width roll that could be detrimental to the film because of marks or lines. The efficient method of transversely restraining the film reduces the amount of neck-down, thus providing more usable area of film. Also the processed film has a more uniform gauge in that the edges have been evenly restrained during elongation and heat set. In a similar manner the utilization of small rubber coated rolls in the heat-set unit prevents relaxation of the oriented film in the transverse direction.

In the orientation of a film as has been set forth above, it is desirable to impart the elongation or stretch while the film is just above the second order transition temperature. For example, a copolymer having a terephthalate to isophthalate ratio of 90/10 has a second order transition temperature of approximately 160° F. (71° C.). Therefore, the temperature in the transverse and longitudinal stretch zones is in the range of 165° F. to 175° F. (73° C.–79° C.). This temperature is just high enough to permit film orientation without breakage occurring. After the film has been biaxially oriented, it is heat-set at a temperature range of 240° F. to 325° F. (115° C.–163° C.).

While certain representative embodiments and details have been shown for the purpose of illustrating the invention, it will be apparent to those skilled in this art that various changes and modifications may be made therein without departing from the spirit or scope of the invention.

What I claim is:

1. In combination in a film stretching apparatus having a transverse stretch means, a longitudinal stretch means and a heat-set means the improvement comprising at least one localized heat producing unit located prior to the longitudinal stretch means so that the orifice of the heat unit is directed toward the film, knurled surfaces near the ends of at least one longitudinal stretch roll in said longitudinal stretch means, a plurality of small diameter narrow width rolls that coact with the knurled surfaces of said longitudinal stretch roll so as to force the heated edge of film that is being processed into said knurled surfaces, and at least one heat-set roll adapted to receive a biaxially oriented film and containing on the surface thereof at least two narrow circumferentially defined knurled surfaces located near the extremities of the roll that are contacted with a series of small rolls to force the film into said knurled surfaces and cause the heat-set roll to hold the film and prevent transverse film shrinkage by containing the film edges within the knurled surfaces of said heat-setting rolls.

2. The combination according to claim 1 in which a narrow knurled area is located circumferentially about the edges of at least one of the differential speed longitudinal stretch rolls and a plurality of narrow width axially parallel, circumferentially spaced apart rolls abut said knurled surface in rolling contact therewith.

3. The method of stretching a polymeric film which includes the steps of
    (1) supplying a continuous orientable film to a stretch apparatus,
    (2) grasping the film along the edges thereof by a series of chain driven holding protuberances,
    (3) moving the film through said apparatus and simultaneously imparting a transverse elongation thereto,
    (4) directing a stream of heated air on the deformed edges of the film as it passes over a heated roll,
    (5) forcing the heated film edges into the knurled surface of the longitudinal stretch rollers by means of a plurality of small rollers, thus causing the film to be tightly held and maintaining transverse neck-down at a minimum,
    (6) stretching the film in the longitudinal direction by passing it over the series of longitudinal stretch rollers each of which rotates at a greater speed than the preceding roll while holding the edges of the film by the knurled area,
    (7) training the biaxially oriented film through a heat-set apparatus and heat setting said film wherein the film edges are forced into knurled surfaces on the heat-set rolls by a plurality of elastomeric coated rolls whose width is about equal to said knurled surfaces, and
    (8) winding the biaxially oriented heat-set film on a take-off roll.

4. The method of stretching a polymeric film which includes forcing the heated edges of a partially oriented film into the knurled surface of a longitudinal stretch roll by a series of narrow rolls contacting said longitudinal roll, thus preventing transverse neck-down as the film is stretched.

5. The method of heat-setting an oriented polymeric film which includes forcing the edges of a biaxially oriented film into the knurled surface of a heat-set drum by means of a series of narrow rolls contacting said drum whereby the film is prevented from shrinking during the heat-set operation.

6. The combination according to claim 1 in which at least one heat-set roll has a narrow knurled area located circumferentially about the edges thereof and a plurality of narrow width rolls spaced circumferentially around said roll and in rolling contact therewith.

References Cited by the Examiner

UNITED STATES PATENTS

| 2,412,187 | 12/1946 | Wiley et al. | 264—289 |
| 2,560,038 | 6/1951 | Trainer | 264—288 |
| 2,618,012 | 11/1952 | Milne | 264—289 |
| 2,849,752 | 9/1958 | Leary | 264—230 |

ALEXANDER H. BRODMERKEL, *Primary Examiner.*

F. S. WHISENHUNT, *Assistant Examiner.*